Patented Feb. 3, 1953

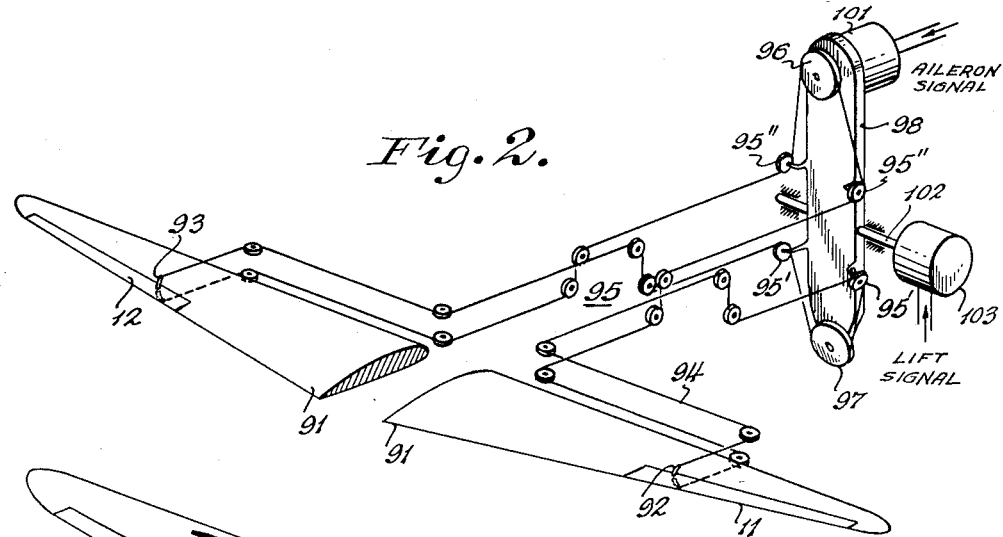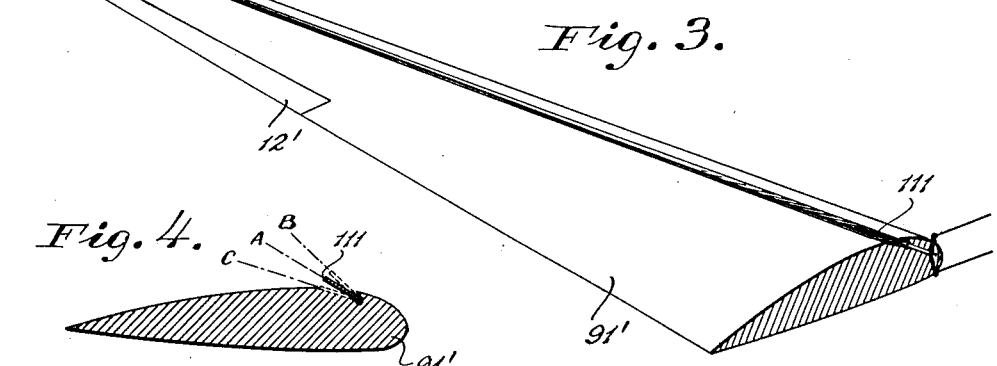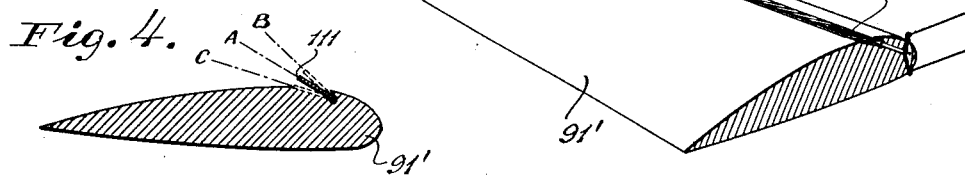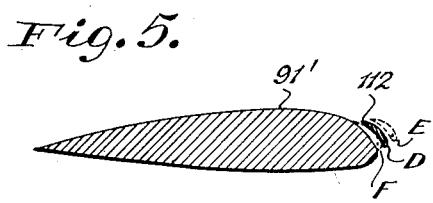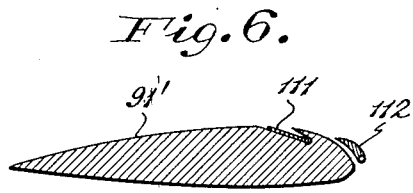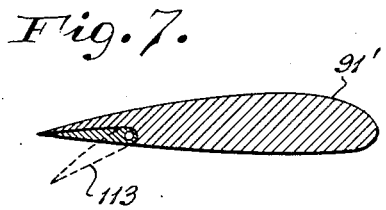

2,627,384

UNITED STATES PATENT OFFICE 2,627,384

FLIGHT CONTROL APPARATUS

Orland E. Esval, Huntington, N. Y., assignor to The Sperry Corporation, a corporation of Delaware Application August 7, 1947, Serial No. 767,020

7 Claims. (Cl. 244—77)

This invention relates, generally, to aircraft flight control apparatus, and more particularly concerns means for automatically controlling the lift of a craft in accordance with predetermined flight patterns and in a manner whereby craft attitude is not affected.

Specifically, the instant invention resides in a lift control system for automatically causing an airplane to fly at a predetermined altitude, or at a predetermined rate of change of altitude, by means which do not affect the attitude of the craft. By flying a craft in a constant vertical-axis acceleration of one gravitational unit ($g$), its course is a straight line in a vertical plane and its altitude either remains constant or varies at a constant rate. Therefore, by using accelerometer means to detect craft acceleration departures in a vertical plane, from one gravitational unit ($g$), it becomes possible to mitigate the effect of vertical gusts in causing craft pitch, by applying a signal from the accelerometer means to a pitch control surface of the airplane. The pitch control surface of an airplane is normally the elevator, or in the flying wing type of aircraft it becomes the elevon. However, as the elevators, or the elevons, do not operate on the center of gravity of the airplane, but only cause the craft to pitch about the center of gravity, applying the accelerometer signal to the elevators becomes unsatisfactory due to the large time constant involved in thereby effecting a change of altitude. In other words, to correct for a pitch change, such as might be caused by a gust of wind, by putting in an elevator signal, the airplane must first be made to assume a climbing or gliding attitude. As this takes time, the gust of wind may have disappeared before the necessary craft pitching takes place that can keep the craft at a constant altitude, or at a constant rate of change of altitude.

In order to provide a system that is substantially free of this objectionable time lag, the instant invention recognizes that the control surface means must be capable of applying a corrective moment near the craft's center of gravity, which position is also sometimes defined as the aerodynamic center of lift pressure, or as hereinafter referred to—the aerodynamic center of the craft. In any event, the control surface means must be located on the craft so as to be effective to change craft lift without changing craft attitude.

While conventional ailerons, arranged to be simultaneously movable upwardly or downwardly, would normally provide lift changes without causing appreciable change in pitch, many other control surface configurations may be evolved which would produce equally satisfactory results, the prime requisite of the element of the instant invention comprising control surface means being ability to rapidly change lift without changing attitude. Thusly, the control surface means may additionally take the form of wing slots, spoilers or flaps, or any combinations thereof, provided their action is such as to alter lift without affecting craft attitude. These additional forms of control surface means may be made to exert a moment-free lift changing effect at the aerodynamic center of pressure (or aerodynamic center of lift as it is hereinafter referred to) to thereby alter lift without effecting a change of craft attitude.

Further, the weather-vane effect on the stabilizer element of a conventional type aircraft that occurs in certain types of air gusts may be overcome by also making the elevator control surface responsive to the signals from the accelerometer means, in a sense arranged to counteract this last and smallest source of craft pitching motion.

Therefore, a prime feature of the instant invention resides in providing a system of flight control in which craft pitching motion is reduced to a minimum, while the craft is in either constant altitude flight, or in a glide path, thereby providing a flight control system affording maximum passenger comfort.

Alternatively, suitable strain gauges placed in the craft wing section and arranged to measure the strain on these wing sections, and therefore the lift, may be substituted for the accelerometer means to be illustrated herein. Such strain gauges and their application are further described in the copending patent application Serial No. 575,487 of Richard Brannin, filed on January 31, 1945 which issued as Patent No. 2,553,546 on May 22, 1951 and entitled "Airplane Automatic Pilot."

The invention also relates to the novel features or principles of the instrumentalities described herein, whether or not such are used for the stated object, or in the stated fields or combinations.

In the drawings,

Fig. 2 illustrates a mechanical arrangement whereby conventional ailerons may be made to be simultaneously moved upwardly or downwardly in addition to movement in the manner conventional to ailerons;

Fig. 3 illustrates an aircraft wing with spoiler type control surface means, and Figs. 4, 5, 6 and 7 illustrate several alternative forms of control surface means.

Figure 1:
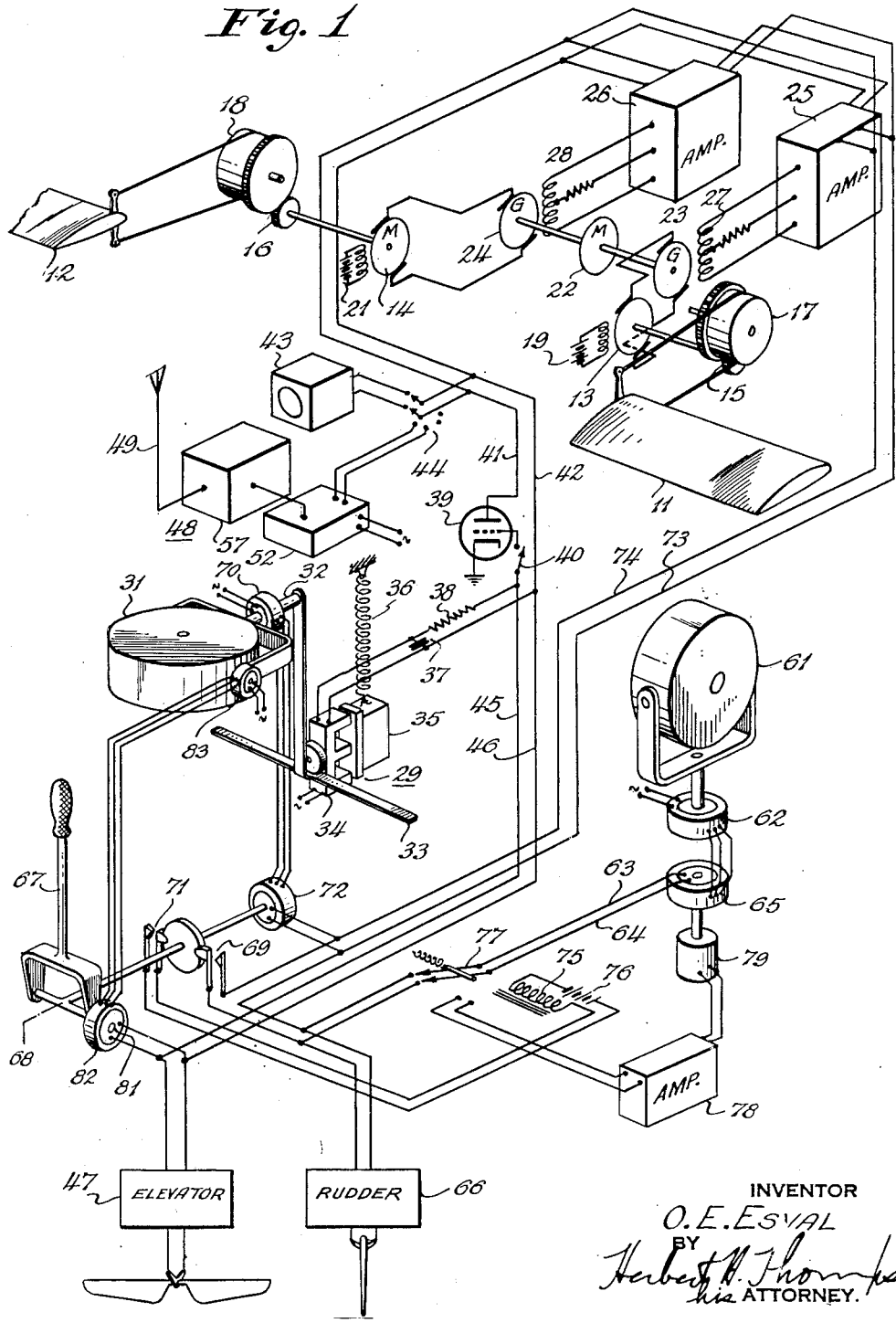
Fig. 1 is a schematic illustration of a preferred embodiment of the invention.

Referring now to Fig. 1 of the drawing, an aircraft (not shown) is equipped with control surface means, comprising, in this instance, the control surfaces 11 and 12. These control surfaces are preferably located to be effective in the aerodynamic center of lift of the craft. As stated earlier, the actual size, shape and location of the control surface means are such as to be effective to change craft lift without changing craft attitude. The control surfaces 11 and 12 may be ailerons disposed as above defined and arranged to act sympathetically or antagonistically (i. e., both up, or one up and one down) or may be conventional flaps provided with means for rapid actuation. The control surfaces 11 and 12 are respectively arranged to be actuated by means of the servomotors 13 and 14, said servomotors being provided with gears 15 and 16 for rotating the drums 17 and 18 which in turn actuate the control surface means 11 and 12 in the manner illustrated.

The servomotors 13 and 14 are provided with fixed excitation by means of the voltage sources 19 and 21 respectively, the armature currents of said servomotors being supplied by the Ward-Leonard motor-generator arrangement including motor 22 and generators 23 and 24. The generators 23 and 24 are in turn controlled in accordance with signals to be hereinafter defined, which signals are amplified in the amplifiers 25 and 26 and the amplified signal voltages applied to the generator windings 27 and 28.

Normally, automatic pilot amplifiers derive rates from the displacement signal to establish adequate damping in the system. While rates in amplifiers 25 and 26 theoretically may not be necessary, the addition of a time derivative may be provided to overcome servo time lags.

In this embodiment, the basic signal for controlling the output from the amplifiers 25 and 26 is the accelerometer 29. The accelerometer 29 may take any of several well-known configurations, but in this instance, is illustrated as having an adjustable reference datum provided by the vertical gyro 31 mounted to pivot about the support 32 and carrying the offset reference platform 33 for the E pick-off unit 34, as is described in more detail in my co-pending application Serial No. 682,602 filed July 10, 1946, which issued as Patent No. 2,553,560 on May 22, 1951, entitled "Aircraft Turn Control." The spring suspended accelerometer unit 35 mounted on a spring means 36 may be restricted to measure normal craft axis acceleration by means not shown herein but also explained in my above referred to co-pending application. The reference datum for the pick-off device 34 of the accelerometer means 29 provides zero output when the acceleration is one gravitational unit (g) and the craft is in straight line flight. However, in a banked turn, the datum of the pick-off is altered to produce zero output when the normal acceleration is equal to the product of one (g) and the secant of the bank angle.

Normally, and for purposes of providing a repeat back, a signal may be derived from either a displacement selsyn coupled to the drums 17 and 18, or from a torque responsive signal measured at the servo, which signal would be fed back to the respective amplifier which produces the servo signal. The feedback would be introduced in such a way as to oppose the gyro or accelerometer signal, and thereby limit servo motion. Such repeat back systems, be they electrical or force repeat back, are well known to the art and are not further described herein.

Alternatively, the accelerometer means 29 may be replaced with the accelerometer means illustrated in the application of John M. Slater, Serial No. 679,376, filed June 26, 1946, which issued as Patent No. 2,595,309 on May 6, 1952, and entitled "Flight Control Apparatus for Aircraft," wherein the vertical component of lift is constant and is made equal to the mass of the aircraft times the acceleration of gravity on the aircraft.

Referring once more to Fig. 1 of the drawing, the output from the accelerometer means 29 is preferably integrated by the integrating means including the capacitance 37 and the resistor 38. Also provided for the output signal from the accelerometer means is a vacuum tube 39 serving to isolate other signals, to be hereinafter described, from interfering with the accelerometer signal output. While a vacuum tube has been used, in this instance, many other isolating devices well known to the art may alternatively be employed with equally satisfactory results. The signal output from the accelerometer means 29 is then transmitted by the lines 41, 42 as an input to each of the amplifier means 25 and 26, and in the same sense, whereupon the amplified output therefrom will serve to control the control surface means 11 and 12 through the motor generator arrangement heretofore described. While Fig. 1 of the drawing illustrates a preferred embodiment of the instant invention as incorporating a pair of control surfaces having no mechanical link therebetween and in which either sympathetic or antagonistic movement of these control surfaces may be obtained from the amplifier arrangement as illustrated, Fig. 2 illustrates an alternative arrangement employing a mechanical linkage between the control surface means and may be substituted for the arrangement illustrated in Fig. 1. Accordingly, the control surfaces 11 and 12, illustrated as being mounted on the wing 91, in Fig. 2, are provided with rocker arms 92 and 93, which in turn are secured to the rigging line 94 in a manner whereby motion of the rigging line 94 will act to displace rocker arms 92 and 93. Rigging line 94 is arranged to travel on the pulley system, generally identified at 95, in accordance with motion imparted to the rigging line 94 by the driving pulleys 96 and 97, which are mounted on the plate 98. Driving pulley 96 is arranged to be rotated by the servomotor 101 which may be made responsive to signals designed to produce normal aileron (or antagonistic) motion of the control surfaces 11 and 12. Driving pulley 97, on the other end of plate 98, is mounted to be freely rotatable and will serve to permit the rigging line 94 to impart the above-mentioned type of control surface action.

Plate 98 is pivotally mounted on the shaft 102 and pivotal motion may be imparted to the plate 98 by the servomotor 103. By virtue of the offset mounting of pulleys 95'95' and pulleys 95''95'', with respect to the pivot axis 102 of plate 98, pivotal motion of plate 98, incurred through action of servomotor 103, will serve to produce sympathetic (simultaneously upwardly and downwardly) displacement of the control surfaces 11 and 12, to thereby control craft lift. Servomotor 101 is, therefore, made responsive to the aileron signal, while servomotor 103 is made responsive to the lift signal as determined by the accelerometer means, strain gauge devices, altimeters or glide path receivers, or any combination thereof as herein provided.

A control surface means in the form of spoiler 111 capable of being adapted to be effective, upon actuation to change craft lift without affecting change in craft attitude, is illustrated in Fig. 3, as being mounted in the wing section 91'. Normal aileron action may, in this instance, be provided by the aileron 12', or alternatively, aileron 12' (and its counterpart 11', not illustrated) may additionally be made to assist in effecting lift changes by the methods hereinbefore illustrated or described.

In Fig. 4 three possible positions for spoiler 111 relative to the wing section 91' are illustrated. Position A may be considered to be the normal position and positions B and C would then become working positions for spoiler 111; position C being one in which lift would be a maximum and position B being the position of spoiler 111 in which lift would be minimized.

Three positions for a conventional Handley-Page slot for the wing section 91' are illustrated in Fig. 5. The normal operating position for the slot 112 could be as indicated by position D. If it were desired to increase lift, the slot would be moved to position E, whereas in position F, lift could be minimized.

The wing section 91' including a combination of a Handley-Page slot 112 and spoiler 111, is set forth in Fig. 6. Fig. 7 illustrates a wing section 91' having one form of a flap 113 for altering craft lift. Many alternative forms of flaps, arranged to rapidly respond to the left control signals, could also be provided. However, further types and combinations of flaps, spoilers, slots and other control surfaces, are not illustrated herein as they are well known to the art. In any event and in all the cases illustrated, the various control surface means would be made responsive to the lift signals herein described.

In some applications and for certain purposes it would be sufficient to fly a craft in accordance with the signal from the accelerometer, but in other applications and for other purposes it might be advisable to provide other types of signal sources to assist in maintaining the craft in a predetermined flight pattern. The altimeter means 43 having a signal output in accordance with deviations from a predetermined altitude may selectively be added to the acceleration signal by means of the selector switch 44. By superimposing signals from the altimeter means 43 on the signal from the accelerometer means 29 and applying the combined signals through the amplifying means to servomotor mechanisms previously described to the control surface means, extremely accurate control of craft altitude may be obtained. Also, if it is desired to control the craft without recourse to the accelerometer means, switch 49 may be opened.

Due to the presence of the stabilizer unit in conventional craft, gusts of wind would normally act on this surface, thereby to cause craft pitch motion notwithstanding efforts to maintain the craft's attitude unchanged. To overcome this last possibility of producing craft pitch, part of the signal from the accelerometer means 29 is transmitted by the lines 45 and 46 to the elevator servo mechanism 47 in a sense to counteract changes in pitch. The part of the signal of the accelerometer means transmitted to the lift controlling or aileron motor is effective to vary the lift of the craft. The signal of the accelerometer means for the respective lift and pitch control motors is such as to vary the lift of the craft without applying pitching moments to the craft so that the control apparatus functions to maintain the craft in a predetermined straight flight path in a vertical plane.

While the apparatus defined to this point would serve for maintaining the craft in constant altitude straight line flight, if it is desired to enter the craft into a glide path and maintain the craft in constant attitude, the same mechanism may be employed with one exception. This exception provides the substitution of the glide path means 48 for the altimeter means 43. The glide path means 48 includes the glide path antenna 49, receiver unit 51, and the balancing modulator 52. The signal from the glide path means may be superimposed on the signal from the accelerometer means 29 by turning the switch 44.

Also illustrated in the drawing for the purposes of providing a complete control for a craft is the directional gyro 61 mounted to detect changes of craft direction. Upon such changes of craft direction, selsyn unit 62 will produce an output signal, which signal is transmitted by suitable lines to the selsyn unit 65. In the event the signal from selsyn 62 is in disagreement with the signal from selsyn 65, a control signal will be transmitted by the lines 63 and 64 to the rudder servo mechanism 66, thereby providing a directional stability to the craft. In the event it is desired to cause the craft to turn to a new heading, a control stick 67 is pivoted about an axis 68 whereby displacement of the control stick 67 will cause contact points 69 and 71 to close. Selsyn 72 is arranged to provide a signal output in accordance with either a deviation in craft bank angle, as determined by the selsyn 70, associated with the gyro 31 or in accordance with motion to the right or left of the control stick 67; this signal from the selsyn 72 being transmitted to the rudder amplifier and servo mechanism 66. The same turn signal is also transmitted by the lines 73 and 74 to the amplifying means 25 and 26, equally but in opposite sense (opposite polarity) wherein the control surfaces 11 and 12 are actuated to produce craft bank and will thereupon cause the craft to turn. The closing of the contact points 71 will cause the coil 75 to be energized by the voltage source 76 thereby drawing the switch 77 from the position illustrated to make contact to the input of the amplifier 78 thereby causing the motor 79 to rotate the reference point of the selsyn 65 in accordance with the changing heading of the craft. Thereby the directional reference 61 will assume the new reference heading upon completion of the instituted turn.

Elevation changes may be accomplished by displacing the control stick 67 about the axis 81 whereupon the selsyn 82, associated with that axis, is productive of the signal output which is transmitted to the selsyn 83 located on the pitch axis of the gyro 31. Displacement of the selsyn 81 also provides a signal for the elevator amplifier servo mechanism 47 and thereupon institutes an elevator signal that may be arranged to displace the elevator.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an aircraft with ailerons operable to vary the lift and change the roll attitude of the craft and elevators operable to change the pitch attitude of the craft; control apparatus for maintaining the craft on a predetermined straight flight path in a vertical plane and in a substantially level condition including, means on the craft providing a signal in accordance with the acceleration of the craft along its vertical axis, means for detecting tilt of the craft from a reference position about its pitch and roll axes, signal means operated by said tilt detecting means providing a signal in accordance with tilt of the craft about its roll axis, signal means operated by said tilt detecting means providing a signal in accordance with tilt of the craft about its pitch axis, first motive means connected to the ailerons responsive to a part of the signal of said acceleration signal providing means for varying the lift of the craft and responsive to said roll tilt signal means for controlling the attitude of the craft about its roll axis, and second motive means connected to the elevators responsive to a part of the signal of said acceleration signal providing means and the signal of said pitch tilt detecting signal means, the signal of said acceleration signal providing means for each of said motive means being such as to vary the lift of the craft without applying pitching moments to the craft.

2. In an aircraft with ailerons operable to vary the lift of the craft and elevators operable to change the pitch attitude of the craft; control apparatus for maintaining the craft on a predetermined straight flight path in a vertical plane including, means on the craft providing a signal in accordance with the acceleration of the craft along its vertical axis, means for detecting tilt of the craft from a reference position about its pitch axis, signal means operated by said pitch tilt detecting means, first motive means connected to the ailerons responsive to a part of the signal of said acceleration signal providing means for varying the lift of the craft, and second motive means connected to the elevators responsive to a part of the signal of said acceleration signal providing means and the signal of said pitch tilt detecting signal means, the signal of said acceleration signal providing means for each of said motive means being such as to vary the lift of the craft without applying pitching moments to the craft and thusly maintain the craft on the predetermined flight path.

3. In an aircraft with ailerons operable to vary the lift of the craft and elevators operable to change the pitch attitude of the craft, control apparatus for maintaining the craft on a predetermined straight flight path in a vertical plane including, means on the craft providing a signal in accordance with the acceleration of the craft along its vertical axis, means for detecting tilt of the craft from a reference position about its pitch axis, signal means operated by said pitch tilt detecting means, means on the craft providing a signal in accordance with deviation of the craft from a predetermined altitude, first motive means connected to the ailerons responsive to a part of the signal of said acceleration signal providing means and the signal of said altitude signal providing means for varying the lift of the craft, a second motive means connected to the elevators responsive to a part of the signal of said acceleration signal providing means and the signal of said pitch tilt detecting signal means, the signal of said acceleration signal providing means for each of said motive means being such as to vary the lift of the craft without applying pitching moments to the craft and thusly maintain the craft on the predetermined flight path.

4. In an aircraft with ailerons operable to vary the lift of the craft and elevators operable to change the pitch attitude of the craft; control apparatus for maintaining the craft in a determined straight glide path in a vertical plane including, means on the craft providing a signal in accordance with the acceleration of the craft along its vertical axis, means for detecting tilt of the craft from a reference position about its pitch axis, signal means operated by said pitch tilt detecting means, means on the craft providing a signal in accordance with deviation of the craft from a determined radio glide path, first motive means connected to the ailerons responsive to a part of the signal of said acceleration signal providing means and the signal of said glide path providing signal means for varying the lift of the craft, second motive means connected to the elevators responsive to a part of the signal of said acceleration signal providing means and the signal of said pitch tilt detecting signal means, the signal of said acceleration signal providing means for each of said motive means being such as to vary the lift of the craft without applying pitching moments to the craft and thereby maintain the craft on the determined glide path.

5. In an aircraft with a surface operable to vary the lift of the craft and elevators operable to change the pitch attitude of the craft; control apparatus for maintaining the craft on a predetermined straight flight path in a vertical plane including, means on the craft providing a signal in accordance with the acceleration of the craft along its vertical axis, means for detecting tilt of the craft from a reference position about its pitch axis, signal means operated by said pitch tilt detecting means, first motive means connected to the lift varying surface responsive to a part of the signal of said acceleration signal providing means, and second motive means connected to the elevators responsive to a part of the signal of said acceleration signal providing means and the signal of said pitch tilt detecting signal means, the signal of said acceleration signal providing means for each of said motive means being such as to vary the lift of the craft without applying pitching moments to the craft and thusly maintain the craft on the predetermined flight path.

6. In an aircraft with a surface operable to vary the lift of the craft and elevators operable to change the pitch attitude of the craft, control apparatus for maintaining the craft on a predetermined straight flight path in a vertical plane including, means on the craft providing a signal in accordance with the acceleration of the craft along its vertical axis, means for detecting tilt of the craft from a reference position about its pitch axis, signal means operated by said pitch tilt detecting means, means of the craft providing a signal in accordance with deviation of the craft from a predetermined altitude, first motive means connected to the lift varying surface responsive to a part of the signal of said acceleration signal providing means and the signal of said altitude signal providing means, second motive means connected to the elevators responsive to a part of the signal of said acceleration signal providing means and the signal of said pitch tilt detecting signal means, the signal of said acceleration signal providing means for each of said motive means being such as to vary the lift of the craft without applying pitching moments to the craft and thusly maintain the craft on the predetermined flight path.

7. In an aircraft with a surface operable to vary the lift of the craft and elevators operable to change the pitch attitude of the craft; control apparatus for maintaining the craft on a determined straight glide path in a vertical plane including, means on the craft providing a signal in accordance with the acceleration of the craft along its vertical axis, means for detecting tilt of the craft from a reference position about its pitch axis, signal means operated by said pitch tilt detecting means, means on the craft providing a signal in accordance with deviation of the craft from a determined radio glide path, first motive means connected to the lift varying surface responsive to a part of the signal of said acceleration signal providing means and the signal of said glide path providing signal means, second motive means connected to the elevators responsive to a part of the signal of said acceleration signal providing means and the signal of said pitch tilt detecting signal means, the signal of said acceleration signal providing means for each of said motive means being such as to vary the lift of the craft without applying pitching moments to the craft and thereby maintain the craft on the determined glide path.

ORLAND E. ESVAL.

REFERENCES CITED

The following references are of record in the file of this patent:

UNITED STATES PATENTS

| Number | Name | Date |
|---|---|---|
| 1,154,396 | Hayot | Sept. 21, 1915 |
| 2,125,361 | Schwarzler | Aug. 2, 1938 |
| 2,286,150 | Mercier | June 9, 1942 |
| 2,386,777 | Bentley | Oct. 16, 1945 |
| 2,406,588 | Cornelius | Aug. 27, 1946 |
| 2,415,429 | Kellogg et al. | Feb. 11, 1947 |
| 2,420,932 | Cornelius | May 20, 1947 |
| 2,486,402 | Hacskaylo | Nov. 1, 1949 |
| 2,496,809 | Moseley | Feb. 7, 1950 |